United States Patent

Kappe

[11] Patent Number: 5,805,824
[45] Date of Patent: Sep. 8, 1998

[54] METHOD OF PROPAGATING DATA THROUGH A DISTRIBUTED INFORMATION SYSTEM

[75] Inventor: Frank Michael Kappe, Graz, Austria

[73] Assignee: Hyper-G Software Forchungs-und Entwicklungsgesellschaft m.b.H., Austria

[21] Appl. No.: 608,302

[22] Filed: Feb. 28, 1996

[51] Int. Cl.⁶ .................................................. G06F 17/00
[52] U.S. Cl. ........................................................ 395/200.72
[58] Field of Search ............................... 395/200.72, 610, 395/615, 200.7, 200.82; 340/825.02

[56] References Cited

U.S. PATENT DOCUMENTS

5,542,047 7/1996 Armstrong ........................... 395/200.72

Primary Examiner—Ellis B. Ramirez
Attorney, Agent, or Firm—Fitzpatrick, Cella, Harper, & Scinto

[57] ABSTRACT

A method of propagating data through a distributed information system is disclosed wherein in a computer implemented distributed information system, a method of maintaining referential integrity of a plurality of links and documents by propagating updates from a server to a plurality of servers, comprising the steps of; i) the server maintaining an ordered list of the plurality of servers in the distributed information system; ii) the server maintaining a link database containing the plurality of links for locating remote documents stored remotely which are referenced by documents stored locally at the server; iii) the server maintaining an update list including messages reflecting changes to local documents and links and remote documents and links; iv) selecting a priority value (p) with which to transmit the update list wherein the priority value is a real number greater than or equal to 1; v) on a predetermined clock cycle, the server transmitting the update list according to the priority value wherein, the server transmits the update list to a receiving server located adjacent to it on the ordered list, to an integer portion of p-1 other receiving servers selected at random from the ordered list and to another receiving server selected at random from the ordered list with a probability equal to a fractional portion of p; vi) the receiving servers updating their link databases and the locally stored documents with messages from the update list and appending the receiving servers respective lists of object data with the received list of object data; and vii) repeating steps v) through vii).

20 Claims, 8 Drawing Sheets

METHOD OF PROPAGATING DATA THROUGH A DISTRIBUTED INFORMATION SYSTEM

BACKGROUND OF THE INVENTION

1. Field of the Invention

The present invention relates to distributed information systems. More specifically, the present invention relates to a method for propagating data objects such as documents and referential link updates through a distributed information system.

2. Description of the Prior Art

As would be apparent to those familiar with the Internet, occasionally when a user activates a link, as in the case of the World-Wide Web (WWW) or menu item, as in the case of Gopher, the resource the link or menu item referenced cannot be retrieved. In some instances, this situation is the result of a temporary problem with the system or the server on which the resource resides. For the purposes of this discussion, system will generally mean computer networks and/or a plurality of servers interconnected for the purposes of transmitting information. Furthermore, for the purposes of this discussion, servers will generally mean file servers, news servers and the like as would be understood by those of skill in the art. A server is further understood to mean a central processor or computer responsible for maintaining and distributing information such as files, documents and/or references and the like to terminals or computers in communication with the server. However, it is often the case that this situation indicates that the resource has been permanently removed. Since the systems mentioned above rely on Uniform Resource Locators (URL)s for accessing information, this situation may also indicate that the resource has been moved to a new location. It is further possible that a resource is eventually replaced by a different one under the same name, at the same location.

Consequently, a significant percentage of references are invalid. It is reasonable to assume that this percentage will rise as time goes by due to the following factors: an increase in the amount of documents which become outdated and eventually removed; server services becoming discontinued; server services being moved to different server addresses URLs or; being re-used and new resources being given identical link or menu names. As will be apparent to those of skill in the art, it would be desirable to have some support system for automatically removing such "dangling" references to a resource which is deleted, or at least to inform the maintainers of those resources.

For the purpose of clarity throughout the following discussion, conventional hypertext terminology will be used with respect to documents and links as opposed to the more general object terms of resources and references respectively. However, as would be understood by those of skill in the art, the method of the present invention will work for any relationship between any objects.

An important issue that needs to be considered when dealing with distributed information systems and/or protocols is that of scalability. Preferably, the behaviour of a scalable system should not, in most cases, depend on variables such as: the number of servers; documents; links; or concurrent users of the system. In a distributed information system such as the Internet environment, scalability is a significant aspect of system design when considering the rate at which the Internet is currently expanding. Scalability can be further distinguished by four related characteristics namely, performance, traffic, robustness and management.

The performance, which is typically measured by the response time perceived by the user, should not depend on the number of concurrent users or documents. However, it is difficult to meet this requirement in a centralized system. Therefore the use of a distributed system, where users and documents are more or less evenly distributed over a number of servers which are connected by the system, is preferred.

Unfortunately, situations can occur where a large number of users access a small set of documents residing on a single server. Under such circumstances the performance of the distributed information system is similar to the centralized system, in which the majority of the load is placed on a single computer at a certain location in the system. As will be apparent to those of skill in the art, it is preferable to avoid such situations. One solution to this situation is through the use of replication, in which copies of the document are placed on a plurality of servers. For example, a well known scalable system which relies heavily on replication is the USENET news service. When the user reads news, they are connected to a local news server which maintains copies of the recently posted news articles. As a result, when a replicated article is accessed, it does not need to be retrieved from the originating site. Therefore, the response time does not depend on how many other Internet users access the same article at the same time. However, the response time does depend on the number of users connected to the local news server.

When searching through a plurality of documents, the response time will increase with the number of documents searched. Good search engines use data structures giving O (log n) (where O is understood to mean "on the order of") access performance, whereby there exists a constant c such that the time, t taken to search n documents is smaller than c log n. Intuitively, this implies that for large n, a further increase of n will have less effect on t, which is a preferable situation. Therefore it is generally accepted that logarithmic performance is an acceptable method to qualify as being scalable in performance.

Replication typically requires that additional traffic must to be sent via the distributed information system. As is apparent from the foregoing discussion, every news article has to be sent to every news server so that it can be accessed locally. However, it may well be that a significant number of articles sent to the user's local news server are never read by any users from that news server. Care should be taken to ensure that total traffic increases not more than linearly with the number of available servers. For example, a solution wherein every server periodically sends server status information directly to all other servers is not scalable, since it requires $O(N^2)$ messages to be sent where N is the number of servers.

For the purposes of this discussion, "robustness" means that the distributed information system should not rely on a single server or a single system connection to work at all times, nor should it assume that all servers of a given set are available at a given time. Prior art services such as Multi-Server Transaction, Master-Slave and Distributed Update control systems, as will be described in greater detail below, are all examples that do not scale in this respect.

Preferably, the operation of the system should not rely on a single management entity. For example, the Internet's Domain Name Service is effective because its management is distributed. When one considers that the current Internet growth rate is approximately 3 million hosts per year or approximately 10,000 hosts per work day, centralized registration is not feasible. The scalable management requirement also suggests that configuration and reconfiguration of server to server communication paths should be automatic, as opposed to being managed by a single central service.

In the WWW data scheme documents are connected by links. The links are stored directly inside the documents, which offers the advantage of a relatively simple server implementation. However, the absence of a separate link database not only limits the set of linkable document types and prohibits advanced user interfaces such as overview maps, three-dimensional navigation, and the like, it is also difficult to ensure referential integrity of the WWW. For example, removing a document requires parsing of all other documents to find all links pointing to that document. This is required to ensure that all the links are removed or at least the owners of the other documents informed. While such a tool would be conceivable for a local server, it is simply impossible to scan all WWW documents on all servers in the world, without the aid of pre-indexed link databases. Consequently there is no referential integrity in today's WWW, even between documents stored on the same server.

Interestingly, the more primitive, older technology Gopher system does maintain referential integrity in the local server case. When a document which is an ordinary file on the servers file system is deleted, moved or modified, the menu item that refers to it, which is a directory entry, is updated as well. In the Gopher system, this referential integrity is automatically taken care of by the underlying operating system. However, references to remote servers remain unsecure.

While both Gopher and WWW scale adequately with respect to the number of servers, documents, and links, there is a scalability problem with respect to the number of users. For example, when a large number of users access the same document at the same time, the affected server and the system region around it become overloaded. This phenomenon known as a "flash crowd" was observed during the 1994 Winter Olympics in Lillehammer, when the Norwegian Oslonett provided the latest results and event photographs over the Web and was overloaded with information requests. Similar but smaller flash crowds often appear when a new service in announced on the National Center for Supercomputing Applications (NCSA) "What's New" page or in relevant newsgroups.

One strategy for alleviating this problem is to use cache servers, which keep local copies of documents which have, been recently requested. Repeated requests for the document result in users receiving the local copy instead of the original document at the originating site. However, this strategy does not work in two cases: when users access many different documents from a large data set such as an encyclopedia or a reference database; and, when the documents are updated frequently.

When users access many different documents from a large data set, replication of the whole dataset is helpful. However, this would generally require: (a), moving from URILs to Uniform Resource Names or URNs, which identify the document by its name or ID rather than location; and (b), when the documents are updated frequently, some update protocol would be required which ensures that caches are updated so that the latest version of the document is delivered.

In the Hyper-G system as implemented by the present inventor, a database engine is employed to maintain meta-information about documents as well as their relationships to each other, including, but not restricted to, links. Referential integrity can easily be maintained for local documents as the links are stored in a link database and not in the documents themselves. Modifications of documents or their relationships are only possible via the Hyper-G server.

One advantage of the link database is that links are bidirectional, such that users can find the document from the destination and vice versa. In order to maintain bidirectionality, when a link spans more than one physical server boundary, both servers store the link information as well as replicas of the linked document's meta-information. This implies that all updates related to the documents and the link in question have to be performed on both servers in order to maintain referential integrity, therefore requiring a form of update protocol between servers.

A prior art attempt at a solution for this update problem is what is typically known as the multi-server transaction method or collaborating servers method. This method has been implemented in the Xerox Distributed File System and an early version of the Hyper-G system. When a document on one server has to be modified or deleted, the server storing the document acts as a coordinator by contacting and updating all other recipient servers which store replicas of the document. Once all the recipient servers have acknowledged the receipt of the update, the coordinator then instructs them to make the change permanent, thereby completing the transaction.

However, in some situations the multi-server transaction method has scalability problems. For example, when a large number of servers reference a specific document by pointing a link to it or by replicating it, all of the servers must be informed and acknowledge the update before it can be performed. This is a significant disadvantage in that this method considerably increases system traffic. Further, this method also requires that all servers involved have to be online or the transaction cannot be completed. As the number of participating servers increases, the probability that all of them are on-line at any given moment approaches zero. Therefore by employing this method for maintaining referential integrity, it becomes practically impossible to modify a heavily-referenced document.

Another prior art attempt at maintaining referential integrity is what is known as a Master/Slave System comprising one primary server (the master) and a plurality of secondary servers (the slaves). The master server holds a master copy of the replicated document and services all update requests. The plurality of slave servers are updated by receiving notification of changes from the master server or by downloading copies of the master copy. Users may read the document from both the master and slave servers, but write only to the master copy of the document.

This scheme is well-suited to applications where documents are read frequently and updates happen only infrequently. For example, the Sun Yellow Pages (YP) service, now known as System Information name Service (NIS), is a master/slave system.

The master server simplifies conflicts between update requests and maintains referential integrity. However, one disadvantage is that the master server has to be up and online in order to perform updates.

Yet another prior art attempt at maintaining referential integrity is what is known as a the Distributed Update Control method. This method allows any server holding a copy of a document to perform updates on it, without the use of a single coordinating server, even when some servers are unreachable, and without the possibility for conflicts.

One requirement of this method is that any one server is knowledgable of all the other servers, known as a server-set, maintaining copies of the document. Ideally, all the document copies should be identical, but due to system failures and performance problems, it may not be possible or desirable to immediately notify all servers of an update. Instead, a weak consistency is adopted in which all copies eventually converge to the same value at some time interval upon completion of the updates.

However, a basic requirement of the method is to ensure that all read requests are based on up-to-date copies and all updates are performed on the latest version. This is accomplished by a majority consensus in which updates are written to some (greater than 50%) of the servers, selected at random, in the server-set. Prior to each read or write operation, the server that is in charge of performing the request polls the servers and requests the documents version number or last modification time to identify the current version. When the majority has answered, it is assumed that at least one server holds the most up-to-date version. This is based on the principle that in the two majorities of successive polls, there is at least one common member.

The advantage of the Distributed Update Control method is its robustness as there is no single point of failure even if approximately 50% of the server-set fails. However, the primary disadvantage of this method is scalability, because the server-set for any document must be known to all servers in the set. Furthermore, greater than 50% of the servers in the set have to be contacted before every write or read operation. For example, if the server-set contains 1000 servers, a response from 501 servers is required. This requirement may be relaxed for read operations if the weak consistency approach is acceptable. However, it is mandatory for write operations to ensure that no conflicting updates can occur.

Harvest, as taught by Danzig et al. in "Replicating Services in Autonomously Managed Wide-Area Internetworks", 1994, is a relatively new Internet-based resource discovery system which supports a distributed "information gathering" architecture. "Gatherers" collect indexing information from a resource, while "Brokers" provide an indexed query interface with the gathered information. Brokers retrieve information from one or more Gatherers or other Brokers, and incrementally update their indexes. The idea is that Gatherers should be located close to the resources they index, while Brokers are located close to the users.

Harvest heavily relies on replication to achieve acceptable performance. The indexes created by the Gatherers are periodically replicated to the Brokers and as the indexes tend to be large, this has to be done efficiently. Harvest uses a technique called flooding for this purpose. Rather than having a Gatherer send its indexes to all Brokers, they are sent to only k of them, for example k=2. It is then the responsibility of the k chosen Brokers to distribute the indexes to another k each, and so on. While the total number of indexes that have to be transferred remains the same, flooding provides the advantage of distributing the system and server load over the whole system.

The particular flood method employed by Harvest is called flood-d or flood-daemon. Flood-d attempts to minimize the system cost and propagation time of the flood by computing a "cheap", k-connected logical update topology based on bandwidth measurements of the underlying physical system. An important requirement is that this topology should not need manual configuration, but shall be computed and updated automatically. However, determining a good approximation of the optimal topology is computationally expensive, especially when a replication group becomes very large. A replication group is a plurality of servers which replicate the same data. Danzig et al. therefore suggests the use of a hierarchical scheme of smaller replication groups. However, Danzig et al. does not suggest a means for determining and updating this hierarchy automatically.

The method of the present invention provides a solution to the above-identified problems by operating on the principle that a link database would be maintained at every server. The function of the link database is to track all the links pointing to its associated server, i.e. links emanating from and/or pointing to a document(s) residing on the server. By employing this approach, the present invention offers several advantages. In particular, storing the links outside of the documents in a link database provides an efficient solution for the dangling link problem as will be described in greater detail below. Further, a link database also enables more advanced user interfaces for navigation in the information space, such as local maps and location feedback.

Furthermore, each of the plurality of servers maintains an ordered list of all servers in the distributed information system arranged in a predefined orientation. An update list is also maintained at each of the plurality of servers which comprises a list of messages which reflect changes to the documents and/or links.

SUMMARY OF THE INVENTION

It is an object of the present invention to provide a novel method of propagating data through a distributed information system which obviates or mitigates at least one of the disadvantages of the prior art systems.

According to one aspect of the present invention, there is provided a method of propagating data through a plurality of servers, comprising the steps of; i) each of the servers individually maintaining an ordered list of the servers in the distributed information system; ii) each of the servers individually maintaining a database containing address data for locating remote data stored remotely which is referenced by local data stored locally at each of the servers; iii) each of the servers individually maintaining a list of data reflecting changes to the local data; and the remote data of other servers; iv) selecting a priority value (p) with which to transmit the lists of data wherein the priority is greater than or equal to 1; v) on a predetermined clock cycle, the servers each transmitting their respective lists of data to at least one server selected from the ordered list according to the priority value and deleting their lists of data; vi) each of the at least one servers receiving and processing the lists, and appending the list to each of the at least one servers' list of local surface data; and, vii) repeating steps v) through vii).

Preferably, the method of the present invention includes wherein in step i), the ordered list is arranged by an approximate geographical orientation of the plurality of server.

Also preferably, the approximate geographical orientation is circular.

Also preferably, the priority value is a real number in the range from about 1 to about 3.

Also preferably, when p=1 each of the servers transmit their respective lists to a server located adjacent to each of servers on the ordered list.

Also preferably, when p is an integer number greater than one, each of the servers transmit their respective lists to a the adjacent server and to p-1 other servers selected at random from the ordered list.

Also preferably, when p is a real number greater than one, each of the servers transmit their respective lists to the adjacent server, to the integer portion of p-1 other servers selected at random from the ordered list and to one other server selected at random with a probability equal to the decimal portion of p.

According to another aspect of the present invention there is provided a method of propagating object data from a server to a plurality of servers, comprising the steps of; i) the server maintaining an ordered list of the plurality of servers in the distributed information system; ii) the server maintaining a database containing address data for locating remote objects stored at some of the plurality of fie servers which are referenced by local objects stored at the server; iii) the server individually maintaining a list of object data including changes to the address data, local objects and remote objects; iv) selecting a priority value with which to transmit the list of object data wherein the priority is greater than or equal to 1; v) on a predetermined clock cycle, the server transmitting the list of object data to at least one server selected from the ordered list according to the priority value; vi) the server deleting the fist of object data once acknowledgement of the transmission is received from the at least one server; vii) the at least one server receiving the list of object data and updating the database and the local objects with the object data, and appending the at least one servers' list of object data with the received list of object data; and, viii) repeating steps v) through viii).

According to another aspect of the present invention there is provided a method of maintaining referential integrity of a plurality of links and documents by propagating updates from a server to a plurality of servers, comprising the steps of, i) the server maintaining an ordered list of the plurality of servers in the distributed information system; ii) the server maintaining a link database containing the plurality of links for locating remote documents stored remotely which are referenced by documents stored locally at the server; ii) the server maintaining an update list including messages reflecting changes to local documents and links and remote documents and links; iv) selecting a priority value (p) with which to transmit the update list wherein the priority value is a real number greater than or equal to 1; v) on a predetermined clock cycle, the server transmitting the update list according to the priority value wherein, the server transmits the update list to a receiving server located adjacent to it on the ordered list, to an integer portion of p-1 other receiving servers selected at random from the ordered list and to another receiving server selected at random from the ordered list with a probability equal to a fractional portion of p; vi) the receiving servers updating their link databases and the locally stored documents with messages from the update list and appending the receiving servers' respective lists of object data with the received list of object data; and, vii) repeating steps v) through vii).

BRIEF DESCRIPTION OF THE DRAWINGS

A presently preferred embodiment of the present invention will now be described, by way of example only, with reference to the accompanying drawings, in which:

FIG. 3b, shows a plot which measures the effect of average update list size on cycle time by plotting number of messages versus cycles for different values of p according to the simulation of FIG. 3a;

FIG. 3c shows a plot which measures system traffic by plotting the number of messages of messages versus cycles for different values of p according to the simulation of FIG. 3a;

FIG. 4 shows a plot of cycles versus number of servers for updating 50% and 99% of the servers on the system according to the simulation of FIG. 3a;

FIG. 5 shows a logarithmic plot of propagation delay versus priority p for updating 50% and 99% of the servers according to the simulation of FIG. 3a;

FIG. 6b shows a plot exemplifying the effect on system traffic by plotting % optimum versus soft error rate according to the simulation conditions of FIG. 6a;

FIG. 7a shows a plot of time cycles versus MTTR cycles illustrating the effect propagation delay for updating 50% and 99% of the servers in accordance with the simulation of FIG. 6a;

FIG. 7b shows a plot of % optimum versus MTTR cycles illustrating the effect on system traffic delay for updating 50% and 99% of the servers in accordance with the simulation of FIG. 6a;

FIG. 8b shows a plot of number of messages in an update list versus time in cycles illustrating the effect on average list size according to the simulation of FIG. 8a;

FIG. 8c shows a plot of number of messages in an update list (in thousands) versus time in cycles illustrating the effect on system traffic for updates sent and updates sent and acknowledged according to the simulation of FIG. 8a;

DETAILED DESCRIPTION OF THE PREFERRED EMBODIMENTS

Figure 1:
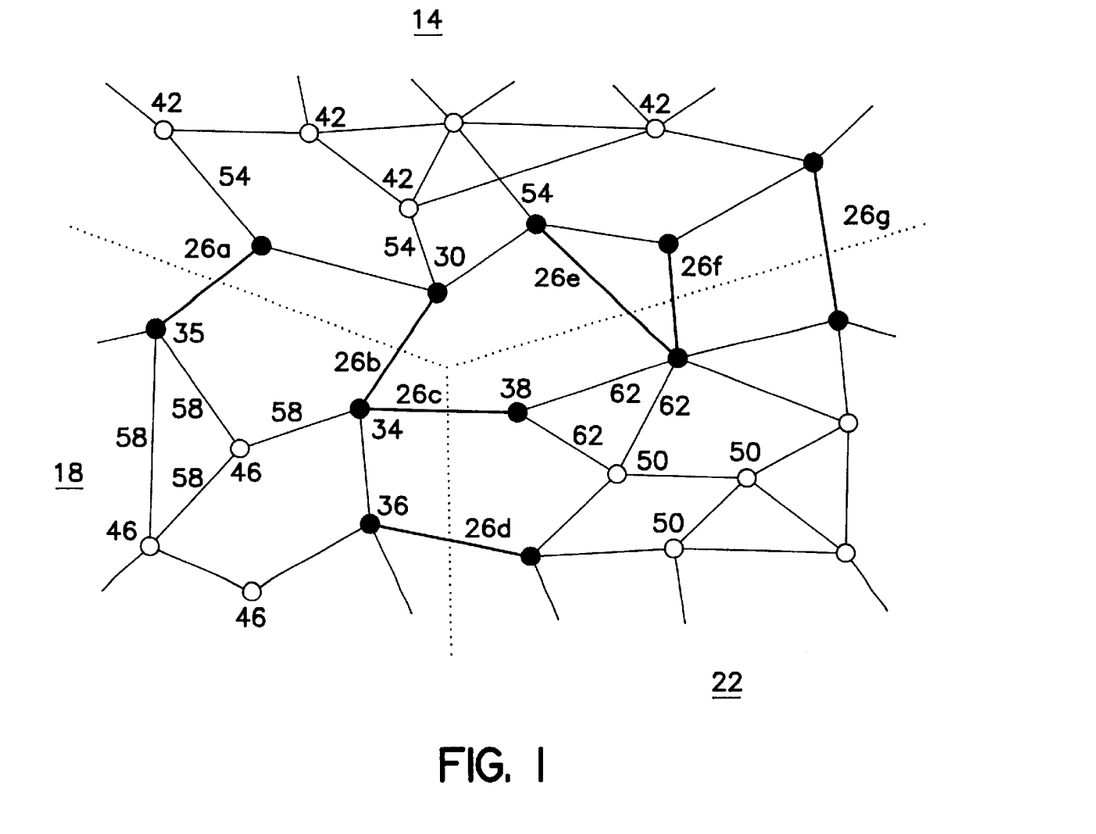
FIG. 1 shows a link map of a system which exemplifies the relationship of a plurality of servers, server boundaries, and links between a plurality of documents.

A method of propagating data in a computer implemented distributed information system, in accordance with an embodiment of the present invention is described in detail below. While the method of the present invention may be used to propagate various types of data, data will hereinafter be referred to as updates, update messages or update lists. However, prior to a discussion of the method of the present invention, a brief description of surface topology as relating to servers and document is required. FIG. 1 shows a link map of a portion of a system, indicated generally at 10, which exemplifies the relationship of a plurality of servers, server boundaries, and links between a plurality of documents.

For purposes of illustration, three servers 14, 18 and 22 are shown in FIG. 1, their boundaries indicated by the dashed lines. However, as would be apparent to those of skill in the art, the number of servers on a distributed system such as the Internet is virtually unlimited. The plurality of links which span server boundaries are indicated at 26a through 26g, hereinafter referred to as surface links. Documents having links which span server boundaries are called surface documents and are indicated for example at 30, 34 and 38, shown as solid dots. A plurality of core documents 42, 46 and 50 and their respective core links 54, 58 and 62 reside within and maintain links locally within servers 14, 18 and 22 respectively. Although not apparent from FIG. 1, a server's surface will typically be small compared to its core.

In general, a link is an address or path description from document to another. In some instances a document may have a link attached which addresses or references an identical copy or replication of the same document stored at another location (another server). In other instances, a link may reference another document stored locally or remotely and therefore require an address path between documents for the purposes of establishing a connection when either document is retrieved by a user. For the purposes of this discussion, addresses or address path will be hereinafter referred to as surface links, core links or simply links when referring to both, as previously described.

In order to maintain the property of bidirectional links, surface link information of surface links 26a through 26g are stored in a link database (not shown) attached to each of servers 14, 18 and 22. The link database stores all surface link information for surface documents stored locally at the server. For example, the link database at server 18 would store surface link information for surface links 26a through 26d as associated with surface documents 34, 35 and 36. For increased performance, servers 14, 18 and 22 also keep replicas of the other surface document's meta-information. For example, server 14 stores surface document 30 plus a replica of surface document 34 meta-information and the surface link 26b between them. Server 18 stores surface document 34 plus replicas of surface documents 30 and 38, meta-information and the surface links. Surface link 26b, from surface documents 34 to 30 is stored in the link database at each of files servers 14 and 18. Surface link 26c, from surface document 34 to 38 is stored in the link databases at each of servers 18 and 22.

By employing this approach, surface documents residing at different servers are interconnected as tightly as the core documents residing on a single server. This bidirectional nature of the surface links enables more advanced navigation techniques as surface link 26a through 26g can be computed and displayed to a user in the form of a link map similar to the illustration of FIG. 1. Furthermore, the method of the present invention also simplifies maintenance of the distributed system. For example, when a user chooses to remove surface document 34, the link database can inform the user that removal of surface document 34 will affect surface document 30 on server 14 and surface document 38 on server 22. The user may either employ this information to manually modify the affected surface documents 30 and 38 and surface links 26b, 26c respectively or permit server 18 to automatically ensure that at least surface links 26b and 26c are removed.

Referential integrity is herein understood to mean that documents and links on the distributed system are maintained up-to-date. The underlying problem with regard to maintaining referential integrity is the method with which affected servers are propagated with update data informing them of changes to surface documents and/or surface links. As previously mentioned, an earlier implementation of the Hyper-G system employed the multi-server transaction method and knowledge about the affected surface documents to directly engage other servers in order to remove surface document 34 and all surface links 26 to and from it. However, this approach was problematic when many servers participate in the transaction. Therefore, the present invention adopts a weak consistency approach, whereby it is accepted that the distributed system may not display referential integrity for a certain duration of time, but is intended to converge to a consistent state eventually. Of course, it is preferable that the duration of the inconsistency is kept to a minimum.

It is also preferable for consistent updates that data propagation may only take place from a pre-defined server. However, in contrast to the previously described master/slave method, this pre-defined server is not a single server for the entire distributed system. The server selected for performing the data propagation depends on the surface document or surface link being modified, inserted and/or removed. For example, with regard to surface documents, updates and subsequent propagation of update data is performed by the server which maintains the original surface document; for surface links, update data propagation is performed by the server which holds the surface document from which the link originates. With respect to partial system 10 of FIG. 1, server 18 is responsible for updates of surface document 34, while the surface link 26b from surface document 30 to surface document 34 would be updated by server 14(assuming that surface link 26b originated from surface document 30). This reduces the problem of overloading any given server, while eliminating the problem of conflicting updates as updates are sequential. For security reasons, users wishing to update surface document 34 must have write permission for that surface document. Permission is therefore checked by server 18 maintaining the originating document 34.

Updates of core documents 42, 46 and 50 or core links 54, 58 and 62 require no further action as integrity of the referential information is maintained at the local link database. However, to maintain referential integrity, other servers need to be notified of updates of surface documents and surface links or, in other words, changes to the server's surface.

The present inventors have developed a novel flood type method for propagating data thereby performing updates and maintaining referential integrity over a distributed system which exhibits the following advantages: good scalability as the traffic generated does not depend on the number of surface links to the surface document requiring updating; recipient servers receiving updates are not required to be available at update time; other types of data can be distributed, such as server addresses and statistics, maintaining the consistency of replicas and caches etc.

In contrast with the conventional, previously described, flood-d method which is optimized for minimizing the cost of the flood due to the large volumes of data handled, the flood method of the present invention can send update notifications which can be encoded in a few bytes. The preferred parameters of the flood method of the present invention, herein referred to as the p-flood method are as follows: speed; robustness; scalability; and automation.

Speed is a preferred parameter because, as previously mentioned, the weak consistency approach is a condition, whereby it is accepted that the distributed system may not display referential integrity for a certain duration of time. Therefore, speed is required in order to minimize the duration of inconsistencies.

Robustness is a preferred parameter as a conventional protocol employed for transmission should ensure eventual delivery of every update to every server, even if some servers are temporarily unavailable. When a server that has been unavailable comes on-line, it should receive all the updates that were missed during its time off-line.

Scalability is a preferred parameter as the time taken to inform all servers of the update should not depend heavily on the number of servers requiring the update. Similarly, the amount of traffic generated by the propagation of the update should not depend heavily on the number of servers. However, as every update must be sent to every server at least once, O(N) is a lower bound for the total traffic generated, where N is the number of servers on the distributed system.

Automation is a preferred parameter because it is undesirable to configure flood paths manually as is currently performed with conventional Internet news services.

Priority is also a preferred parameter because it is intended that the protocol be used for other purposes such as attaching a priority parameter to every update that determines its acceptable propagation delay and bandwidth consumption.

Figure 2:
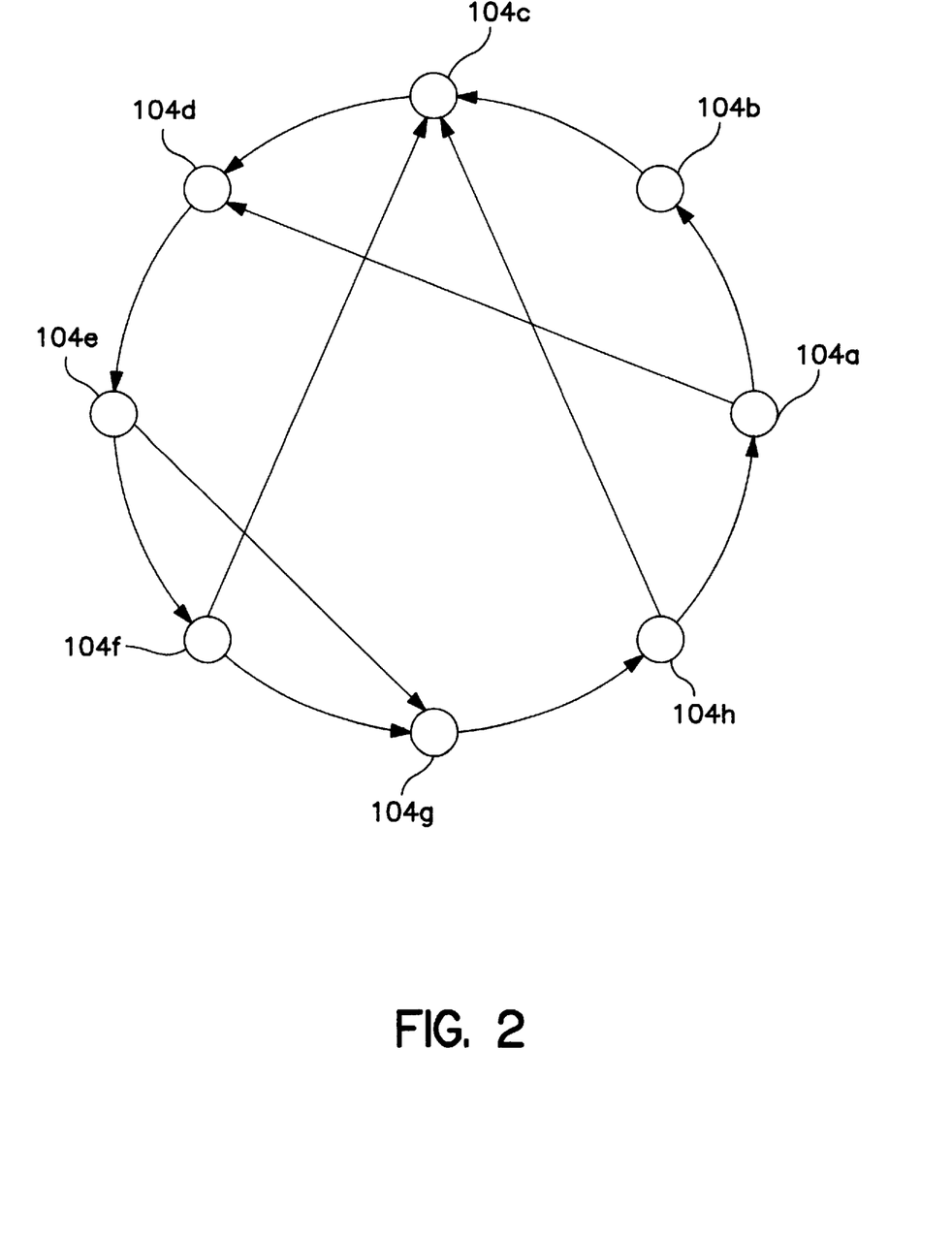
FIG. 2 shows an shows a portion of the method of the present invention for flooding server with data such as update lists in accordance with an embodiment of the present invention.

The p-flood method as implemented by the present inventors is a probabilistic method which fulfils the above-described parameters. FIG. 2 shows a first few steps of the method of the present invention. A plurality of servers are arranged in an approximate geographically circular arrangement as indicated at 104a through 104h. As will be understood by those of skill in the art, the present invention is not limited to the number of servers shown in FIG. 2 and it is contemplated that other arrangements may be employed. The approximate geographically circular arrangement can be determined by sorting the servers according to their Internet address as will be described in greater detail below. Each server 104 is aware of all other servers via a server list which is updated regularly and propagated throughout the distributed system to each of the plurality of servers 104. The server list is arranged in the order determined by the approximate geographically circular configuration.

Servers 104a through 104h accumulate update messages which are generated either by the servers themselves, as a result of modification of a surface document or a surface link, or are received from other servers belonging to the server list. On a predetermined clock cycle, an update list formed of the accumulated update messages is sent top other servers where p≧1). Priority p is a parameter which determines the propagation rate throughout the distributed system. For p=1, the update list is sent only to the server successor (hereinafter simply referred to as successor), as determined by the adjacent position on the server list. The update list is further propagated to p-1 other servers that are chosen at random. For example, when p=3 the update list is propagated to the successor and to two (3-1) other server on the server list, selected at random. If p is fractional, the update is propagated to other servers at random with probability p-1. For example, p=1.3 results in one update list sent to the successor, and another update transmitted with a probability of 0.3 to a server selected at random. p=3.2 means that the update is sent to the successor, two other servers at random plus one other server selected at random with a probability of 0.2.

One iteration of propagation based on a predetermined value of p is called a cycle. FIG. 2 shows one cycle of the p-flood method with p=1.5. Note that at every cycle, the operation described above is performed by all servers 104a though 104h, maintaining their own update lists, in parallel. Within the cycle time period every server performs one cycle however there is no requirement that the clocks of each of servers 104a through 104h be synchronized. Also, at every step p·N update lists are distributed on the server list.

The larger the value of p, the shorter the time it takes to reach all servers on the server list. However, larger values of p result in greater traffic being generated. This is because of the random nature of the propagation, whereby the same update may be received more than once by a single server. The method allows for the assignment of different values of p to individual update lists, therefore, p identifies the priority of the update list.

After an update list has been successfully transmitted from a sending server to its' immediate successor, the receiving servers update their link databases or surface documents based on the update messages in the update list. Deletion of the update list by the sending server is not dependent on successful receipt by a randomly selected server. The sending server then deletes the update message from its update list. For example with regard to servers 104a and 104b, once the update list is propagated, the message is removed from the sending server's 104a update list. This prevents the update message from being retransmitted in future cycles. Updates are time-stamped using a per-server sequence number, so that duplicates can be discarded and updates can be processed in the correct order by the receiving server. This ensures that update message(s) are removed after they have been received by all servers and maintains a relatively short update list.

When a server is down or unreachable the update message (s) are not discarded from the update list until it has successfully been sent to the successor. It is assumed that a reliable transport protocol like Transmission Control Protocol or TCP is used and that receipt of the message is acknowledged. The message will remain on the update list until the successor comes on-line whereafter the accumulated update list is sent by the originator. Consequently, every sender server is responsible for delivering messages to its successor. The penalty is that when a successor is down for an extended period of time, the update list accumulates.

Setting the priority p=1 whereby the sending server only transmits the update list to the successor effectively blocks update messages in the event of a successor server being off-line and is therefore an undesirable priority value. Greater values of p not only increase the propagation rate of the messages significantly, but also contributes to the robustness of the method. For example, in FIG. 2, a crash of server 104b would not inhibit update lists sent with p>1 from server 104a being propagated to the other servers 104c through 104h on the system.

The present inventors have implemented the p-flood method in several extensive simulations which model various "perfect world" and "real world" situations and conditions, the results of which are outlined below. For the purposes of the simulations, the behaviour of the parallel server processes was modelled on a single computer. Under these conditions, for each cycle, the server propagated updates serially as opposed to operating in parallel. However, by processing serially, the simulations indicated that the serialization of the servers could lead to wrong results. For example, for the situation shown in FIG. 2, processing the servers in the order 104a through 104h sequentially would always propagate all update lists to the servers in a single cycle. Subsequently, reality was modelled more closely by processing the servers in an order determined by a randomly chosen permutation of servers. This enabled mimicking the random expiration of the server's timers. However, it is reasonable to expect that under real world situations, update lists will transmit slightly slower, especially when the cycle time is not large compared to the average transmission time of the update lists.

The first simulation conducted using the p-flood method modelled a "perfect world" situation in which all servers are on-line and reachable. This simulation was conducted to determine exactly how the weak consistency philosophy performed. For example, one variable observed was how long it would take to arrive at a consistent state after update list propagation was terminated. Another variable observed was how this time depends on the number of servers, the priority p, and how much traffic is generated over time.

Figure 3A:
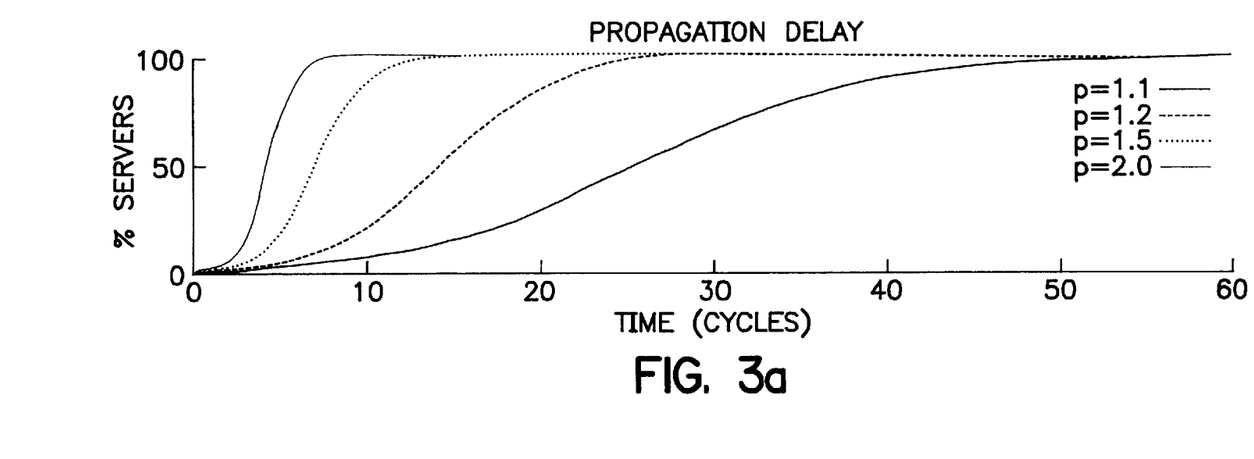
FIG. 3a shows a plot which measures propagation delay by plotting percentage of servers versus cycles, for different values of p for a ideal condition simulation according to the method of the present invention.
Figure 3B:
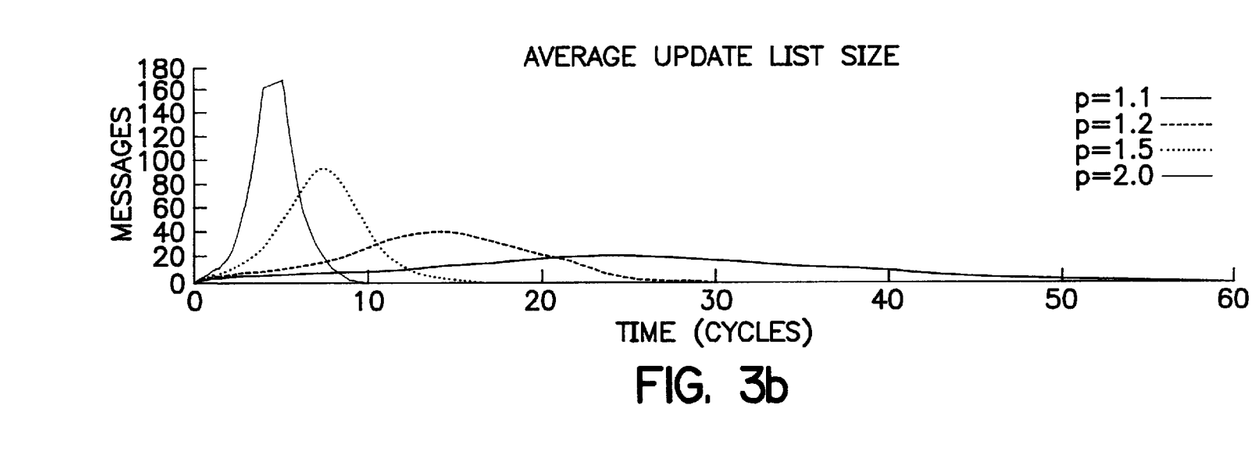
Figure 3C:
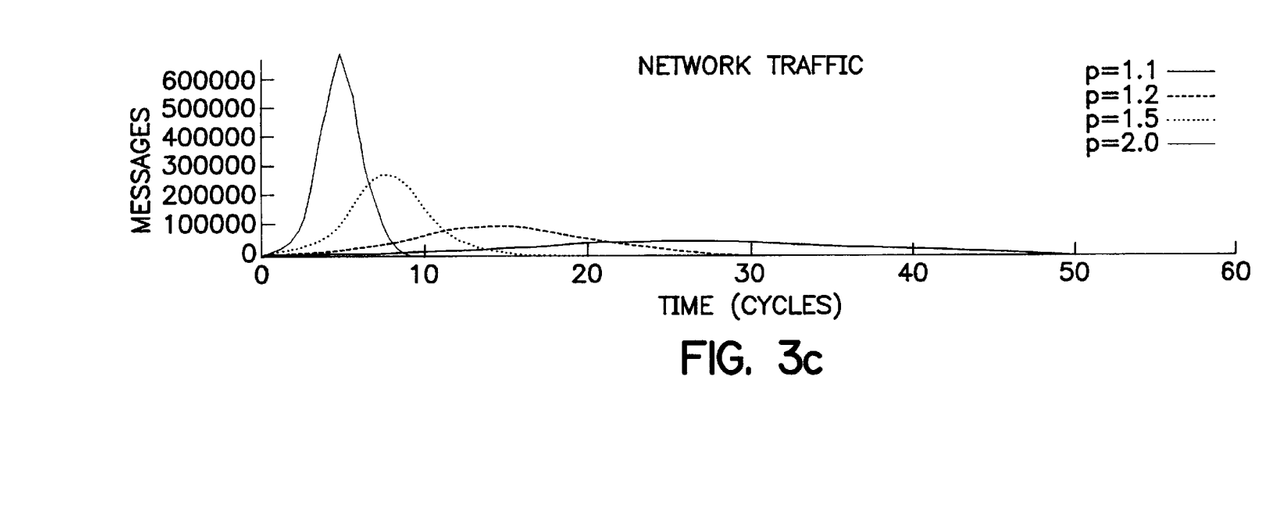

FIGS. 3a through 3c illustrate the performance of p-flood under the above described conditions. It is assumed that m update messages have been generated at the N different servers 104a through 104N prior to commencing the simulation. As the propagation of update lists from sending servers to the successors and random servers was observed, it was determined that it does not matter whether all m updates are made on a single server or whether they are distributed randomly over the N servers.

FIG. 3a shows the propagation delay for flooding 1000 servers using different values of p. As shown in the Figure, a higher value of p gives faster propagation, for example when p=2 and N=1000, 50% of the servers are reached after about 4 cycles, 99% after 7 cycles, and the server is typically updated after 10–13 cycles. However, the cost of a faster propagation rate is a higher load on the servers and system. FIG. 3b shows the average size of the update list held at each server, and the FIG. 3c shows the traffic in messages that is sent at each cycle.

FIG. 3c shows a graph of messages sent by all servers measured against time in cycles. As indicated in the Figure, as the number of messages increases the best performance is achieved with p=2 (ie. 600,000 messages in approximately 4 cycles).

As every message in the update list has to be sent to every server at least once, optimum traffic is achieved when each of the N servers transmits m messages i.e. optimum=m n. Under ideal simulation conditions, as indicated from the experiments above, the total traffic generated by p-flood is p•N•m messages or p•optimum. This illustrates the fact that the p-flood method distributes traffic evenly over time and over the entire system as opposed to the conventional solution wherein every server simply sends all its updates to other servers. The lower the value of p, the more "system friendly" the update list performs. However, as FIGS. 3a through 3c suggest, there exists a tradeoff between fast propagation rates and peak system load. Consequently, the results of the simulation indicate that an acceptable value of p lies somewhere between the values of 1 and 2.

Figure 4:
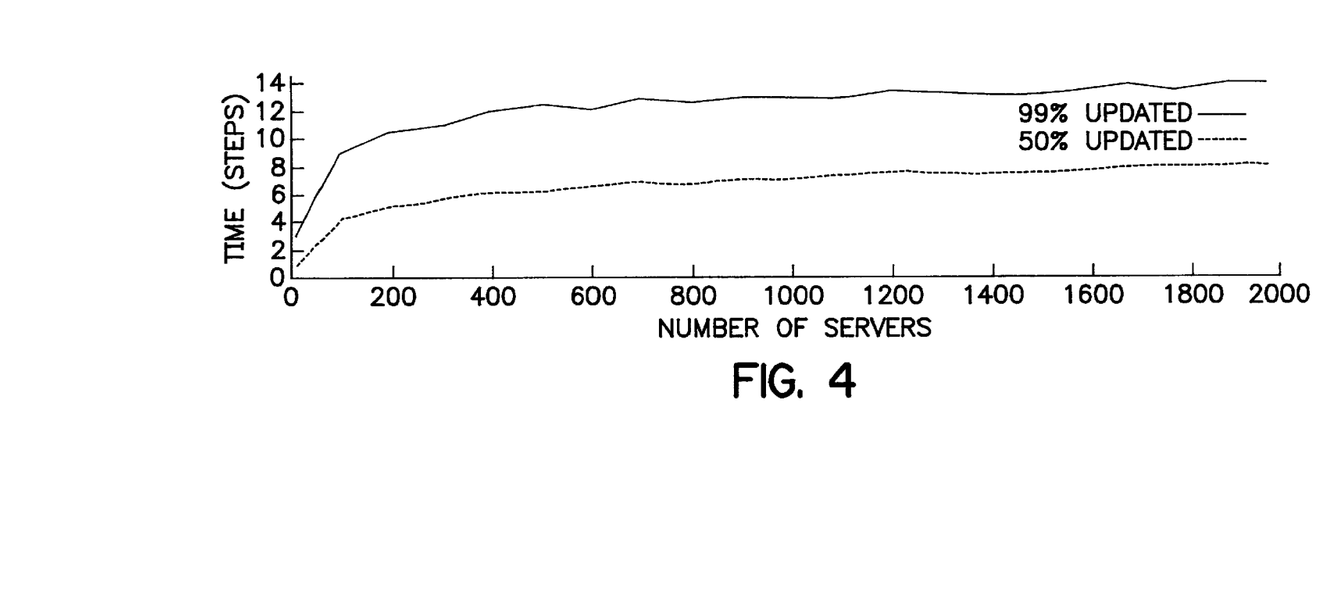

FIG. 4 shows the scalability parameter of the p-flood method with respect to the number of servers in a given server list. As indicated in the figure, for p=1.5, the time in cycles for the update list to reach 50% and 99% of the servers is plotted against the number of servers. FIG. 4 shows that the p-flood method displays logarithmic performance and further indicates that this method is well suited for use in very large server groups.

Figure 5:
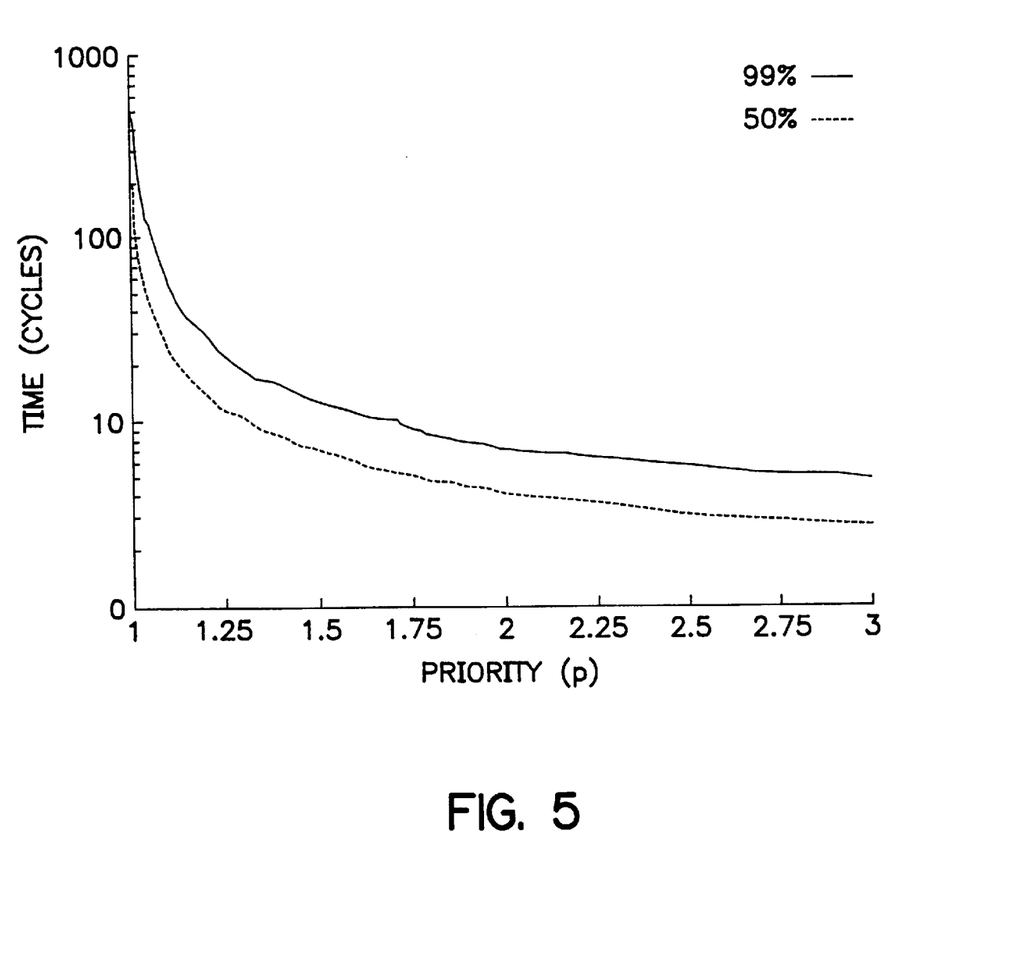

FIG. 5 is a plot of propagation delay versus the priority p for an update list to reach 50% and 99% of the servers with the number of servers held constant at 1,000. For example, when p=1, it takes approximately 500 cycles to reach all 1,000 servers. When p=2, it takes approximately 4 cycles to reach the first 500 servers. As indicated by this simulation, the clocks in each of the plurality of servers, which determine the cycle time, are not synchronized. When one sending server's timer expires, the update list is transmitted to the successor and other servers at random. The successor's timer will in general not expire a full cycle time later but rather after some random time interval between zero and the cycle time of the sending server. On average, the successor's timer will expire after half the sending server's cycle time which explains the observed effect.

As previously mentioned, one of the parameters of the p-flood method is robustness with respect to system and server failures. Prior to a discussion of robustness, a distinction should be made between soft or transient errors and hard or persistent errors. Soft errors are temporary system errors due to routing problems or system overload. This type of error occurs rather frequently on systems such as the Internet but usually for a short period of time. On the other hand, hard errors last longer and usually occur as a result of a hardware failure.

Figure 6A:
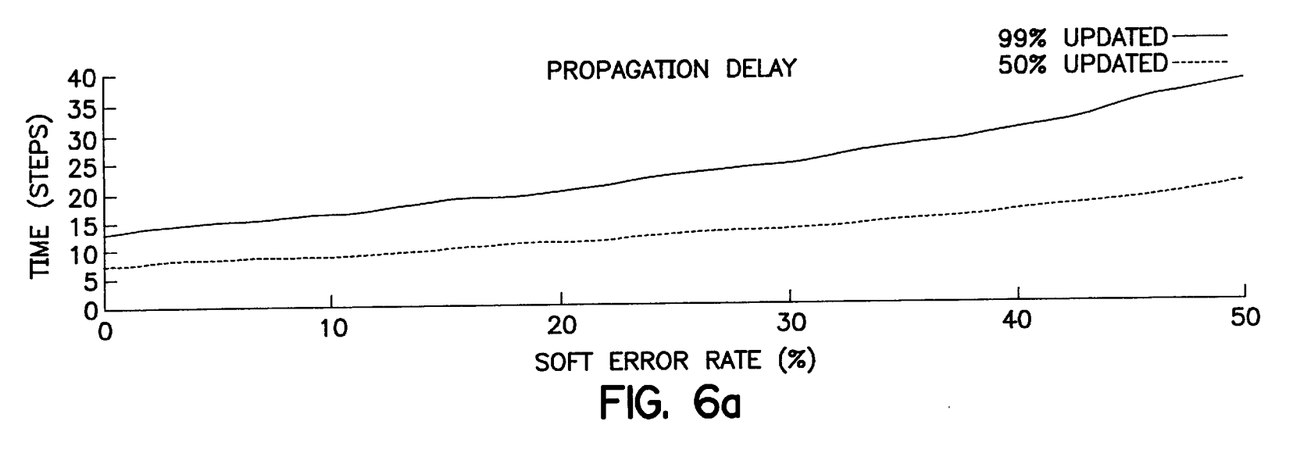
FIG. 6a shows a plot exemplifying the effect on propagation delay by plotting cycles versus soft error rate under a "real world" condition simulation according to the method of the present invention.

FIG. 6a shows the effect of soft errors on propagation delay and the transmission traffic generated. The propagation delay is measured as the time for an update list to reach 50% and 99% of the servers. As indicated in the figure, propagation delay increases slowly with an increasing soft error rate. A soft error rate of 10% indicates that for every cycle, 10% of the update propagation will fail, whereby 10% of the servers, selected at random, will be unreachable. During the next cycle, another random set of 10% will fail. However, it is unlikely that the two sets will be identical.

Figure 6B:
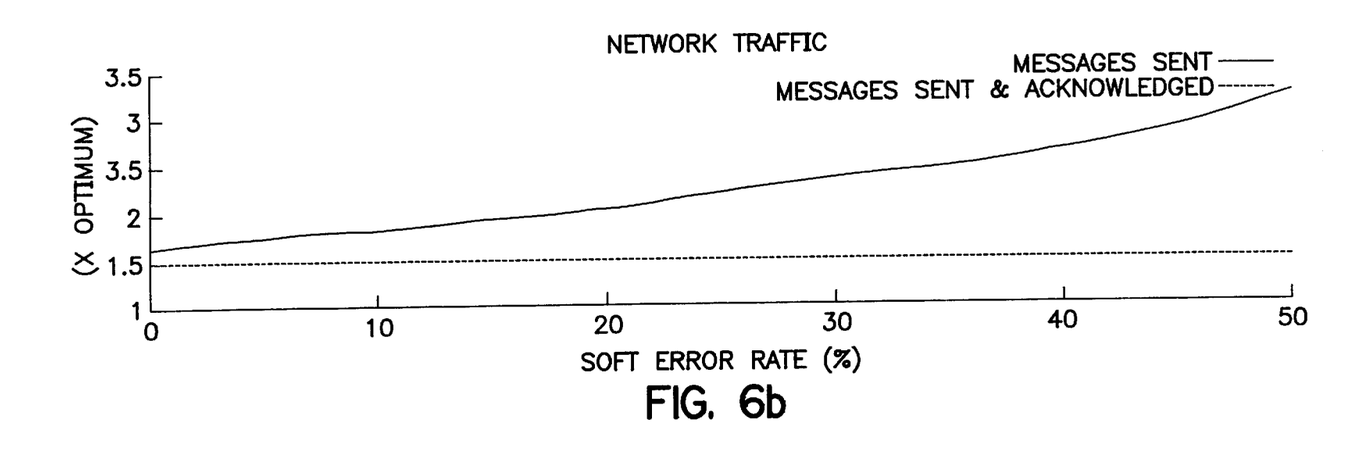

As shown in FIG. 6b, system traffic increases with increased soft error rate. The graph indicates that as the set of messages in the update list sent increases, the number of acknowledged messages remains constant. The results of FIGS. 6a and 6b were acquired under the condition whereby p=1.5 and N=1,000. As the p-flood method detects duplicate messages and messages that arrive out of order, it is contemplated that a conventional protocol such as User Datagram Protocol or UDP could be used to transmit update lists and server lists. However, UDP is susceptible to soft errors such as packet dropping. Therefore, it is preferred that the TCP transfer protocol be used which is capable of repairing a large number of soft errors by itself. During a situation in which a server is temporarily unavailable, the unavailable state is usually detected during the opening of the connection and the update list will not be sent. This indicates that, for a protocol such as TCP, the messages sent plot shown in FIG. 6b is not significant as the number of messages actually sent remains constant with respect to an increasing soft error rate.

Hardware errors are usually described by two variables: mean time between failure (MTBF) and mean time to repair (MTTR). On-line time is defined as the fraction of time the server is online and is given by the equation:

$$\text{On-line time} = \frac{MTBF}{MTBF + MTTR}$$

During "real world" simulations, MTBF and MTTR were measured in terms of cycles. MTTR=1 indicates soft errors whereas larger values of MTTR indicate that a server is not available for a longer period of time and therefore a hard error. An assumption was made that all server are on-line over 90% of the time. At the beginning of the simulation, MTTR÷(MTBF+MTTR) servers are assumed to be off-line and the time off-line is chosen randomly between 0 and MTTR. The remaining servers are assigned an on-line time between 0 and MTBF. A further assumption was made that the servers which are off-line also carry update lists which could have been accumulated prior to their off-line state. Throughout the "real world" simulation, servers that come on-line remain up for MTBF cycles and those that go off-line remain down for MTTR cycles.

Figure 7A:
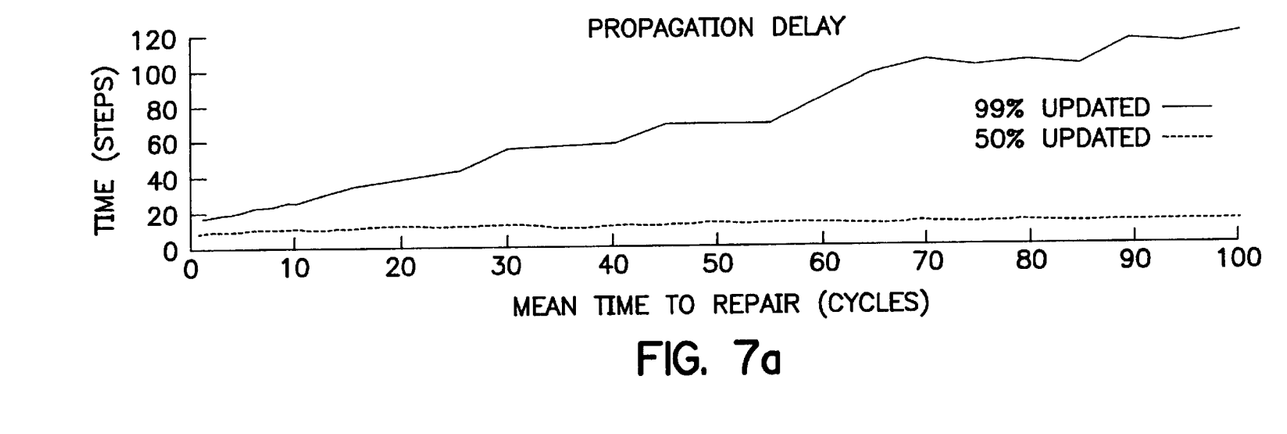
Figure 7B:
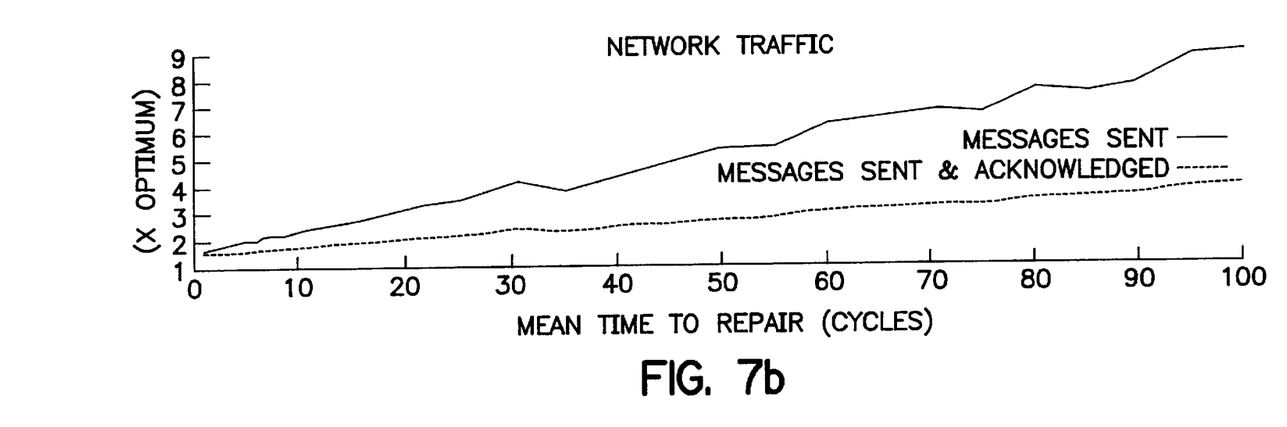

FIG. 7a shows the effect on the propagation delay when cycles are plotted against the MTTR under the conditions that on-line time remains constant at 90%, and MTTR varies between 1 and 100. Due to the probabilistic nature of the p-flood method, there is very little effect on the remaining servers. This result is indicated in the figure in which the time to reach 50% of the servers remains relatively constant. However, there is an impact on the time to reach 99% of the servers because only 90% the servers are available at any given time. Therefore the propagation delay increases approximately linearly with MTTR and the number of messages sent also grows approximately linearly. FIG. 7b further shows the effect of on system traffic when % optimum is plotted against MTTR.

Figure 8A:
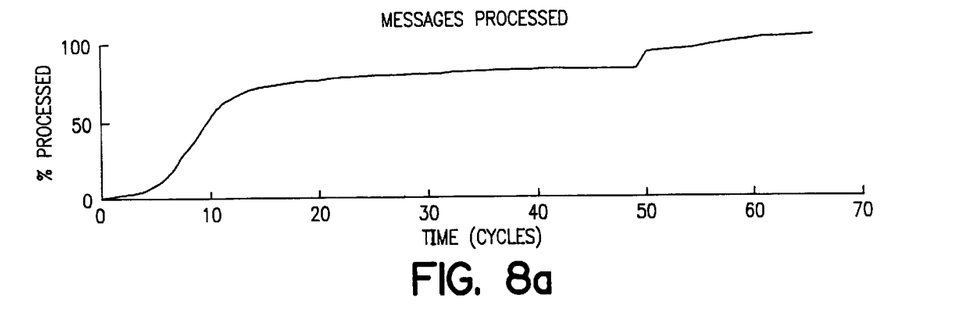
FIG. 8a shows a plot of % of update lists processed versus time in cycles illustrating the effect on the number of updates processed according to a second "real world" simulation condition for p=1.5, N=1000, m=1000.
Figure 8B:
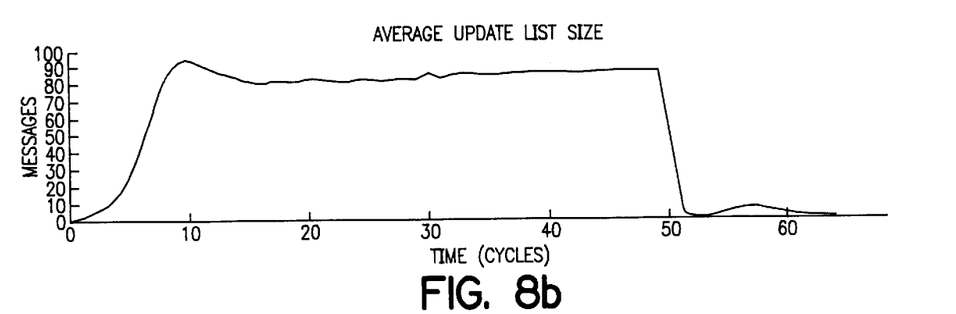
Figure 8C:
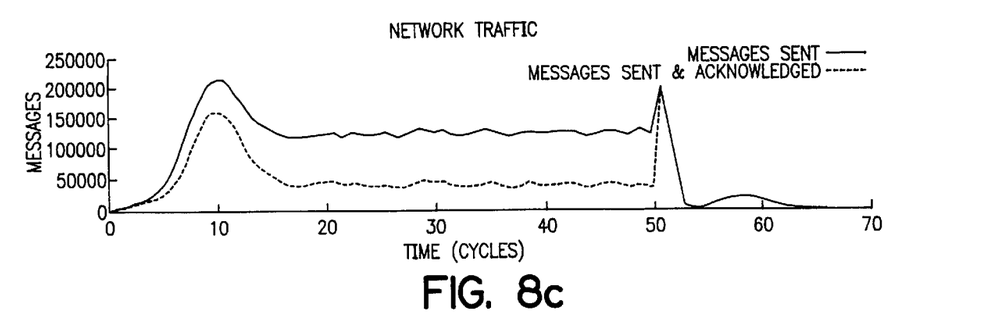

FIGS. 8a through 8c shows more detailed views of the effect of hard errors on the performance of the p-flood method In order to make the effects clearly visible, 10% of the servers (100) are held off-line until cycle 50, at which point the servers are brought on-line simultaneously. The graphs of FIGS. 8a through 8c can be divided into three distinct phases. The first phase occurs up to approximately cycle 17. During phase 1, updates propagate only slightly slower than the p=1.5 curve of FIG. 3a through 3c under the "perfect world" simulation. Updates then level off when approximately 81% of the updates are processed. This is due to the fact that 90% of the updates are then processed by 90% of the servers keeping in mind that the 10% of the servers which are unreachable also generate 10% of the updates.

The second phase occurs between cycles 18 and 49 during which the system is in a relatively stable state. As this state occurs until the remaining 10% of the servers come on-line again, it is desirable to analyse the events occurring during this phase. The present inventors have observed that the set of servers which are off-line can be partitioned in three disjoint groups:

Group 1 are servers which are off-line. The fraction of these are represented by the variable d, then the number of servers in this group is;

$$d \cdot n.$$

Throughout the presently described simulation, d=0.1, n=1000, therefore $$d \cdot n = 100;$$

Group 2 servers are the predecessors of the servers that are down. As the probability of a predecessor also being down equals d, the predecessor therefore belongs to the previous group. The number of members of this group is therefore $$(d - d^2) \cdot n.$$

Again, throughout the presently described simulation, the number of servers in group 2 is 90; and Group 3 comprises the remaining servers, those which are on-line and not predecessors of any unavailable severs (group 2). The number of such servers in group three is:

$$(1-d)^2 \cdot n$$

or in the case of the present example, 810.

The servers of group 3 are able to eliminate their entire update list during the first phase because the message is deleted from the senders' update list once received by the successor. Therefore their update list size during phase 2 is zero. Group 2 servers retain messages destined for the group 1 members. The number of such messages is (1−d)·m at each server and the unavailable servers carry m/n messages each. The average update list size, as plotted in FIG. 8b during phase 2 is therefore $$\frac{(d-d^2) \cdot n \cdot (1-d) \cdot m + d \cdot n \cdot \frac{m}{n}}{n} = m \cdot \left( d - 2d^2 + d^3 + \frac{d}{n} \right)$$

The servers of group 2 continuously attempt to send messages to their successors which are group 1 members and to other random servers. When p=1.5, all group 2 servers send 0.5 update lists per cycle to random file-servers. The success rate of which has a probability of (1−d)), plus one message per cycle to the servers successor which is guaranteed to fail. The servers belonging to groups 1 and 3 do not send messages. The total number of messages sent during each cycle of phase 2 can therefore be calculated as:

$$p \cdot (d-d^2) \cdot n \cdot (1-d) \cdot m$$

or in the case of the present example, 1.5·90·900=121,500. Of these messages, (1−p)/p are successful or one third (40500). This calculation corresponds well with the simulated results shown in the graph of FIG. 8c. Once again, if TCP is employed as a transport protocol, the number of messages sent but not acknowledged is insignificant, due to the fact that a server which is off-line is discovered when attempting to open its connection. No message is sent if the open request fails.

The third phase occurs at cycle 50, after the unavailable servers come on-line. The members of group 2 immediately succeed in propagating their update lists to their successors, which causes the dramatic effects as shown in FIGS. 8a through 8c. After cycle 50, only a few more cycles are required to propagate the updates that were kept by the unavailable servers to all remaining servers.

In attempting to estimate the additional amount of system traffic that would occur when the described architecture is applied to a distributed information system, the present inventor assumed the following values for the previously described variables:

1,000 servers (n);

100 surface objects (documents and links) per server. An assumption is made that a total of 100,000 surface objects exist;

10% of the surface objects are updated per day. Therefore, a total of 10,000 updates messages (m) need to be propagated each day;

Note that while the traffic generated is dependent on the number of servers and surface documents, traffic does not depend on the number of users on the system.

Therefore, the total number of messages sent per day is p optimum, with optimum =n·m or $10^7$ messages where every message is delivered to every server. One message is a approximately 10 bytes in length. When p=1.5, generate system-wide traffic generated would be approximately 1.5× $10^8$ bytes (150 MB) per day, or 4.5 GB per month.

On the other hand, recent statistics based on the National Science Foundation network or NSFnet as of November 1994 reveal that approximately 22,462 GB are transmitted per month. If a further assumption is made that 25% of the entire (non-local) Internet traffic passes through the NSFnet, where the entire traffic on the Internet is approximately 90,000 GB/month, the update messages resulting from implementing the p-flood method would generate an additional 0.005% of system traffic. Therefore the effect of applying such a method is negligible with regard to traffic.

Throughout an actual implementation of the p-flood method there are several details which should be addressed. Due to the random selection of flood paths, updates propagate faster than the previously described cost-based selection but at a higher cost. However, the p-flood method chooses its propagation paths in both non-probabilistic (successor) and probabilistic (randomly) ways where the amount of randomness is controlled by the p parameter. For reasonable values of p, as exemplified with the real-world simulation as previously described, the majority of traffic transmits across the static circle of servers as depicted in FIG. 2. Optimal arrangement of servers in this circle can vastly reduce system cost and delay, without sacrificing the advantages of fast propagation and robustness by employing random choice of some of the flood paths.

Computing the best approximate geographical circle using actual bandwidth measurements would be difficult, as it implies gathering a fully connected matrix of bandwidth between servers. Furthermore, the measurements would have to be repeated quite frequently, because global system utilization of the Internet changes with the time of the day.

Therefore, by applying a heuristic approach, the plurality of servers are sorted according to their reversed fully-qualified domain name. For example, server i is the successor of server i−1, and the first server is the successor of the last one. Sorting by reverse domain name (last character first) results in all servers in for example, Belgium (domain .be) being neighbours in the circle, followed by the servers in Germany (domain .de) and so forth. Within Germany, the servers located in, e.g., Berlin will be neighbours (domain -berlin.de). In the majority of cases, local connectivity is cheaper and faster than international connections. Therefore, this scheme will result in improved use of the available bandwidth. Furthermore, no computations or bandwidth measurements are necessary other than sorting.

When a server is added or removed from the server list, the p-flood method, operating with a high priority p is used to notify all servers. The servers modify their server list accordingly using the sort order previously described.

During propagation of server list updates where servers are added, removed or moved to a different host, it is preferred that a server employs its old server list for flooding, until the message has been acknowledged by the successor. However, simple modifications of server attributes such as description, Internet address, e-mail of administrator etc. do not require such precautions.

When operating a large number of servers a catastrophic event such as a head crash on the server's disk may occur, which results in loss of information. In such an event, operation is resumed from a backup copy of the information base. If the backup copy is x days old, then the restarted server has lost all its updates over the last x days. Servers may also have a presently obsolete picture of the server's surface. For example, a new document may have been created less than n days ago in the server having a link pointing to (or away from) another document on another server. This document has now disappeared and consequently, the link has to be destroyed in order to keep a consistent state. In other words, the servers have to roll back to the state in existence x days ago.

In such a situation, the server may propagate a special message that contains a description of its entire surface (documents and links), requesting all servers to check this picture against their view of our server, and adjust their information about the server accordingly.

Under certain conditions an inconsistency on the Internet may occur. For example, referring back to FIG. 1, assume that a new surface link is placed from surface document 30 on server 14 to a core document 46 on server 18 thereby changing the state of the document from core to surface. At about the same time, before the update message reflecting this operation arrives at server 18, server 18 deletes the core document 46 which the surface link intended to point to. As core document 46 is not on the surface there is no need to inform other servers about the deletion. Consequently, server 14 will not be notified and will keep its link.

Server 18 can detect this inconsistency when the update message from server 14 eventually arrives, since the message is a request to create a link to a surface document 34. Server 18 will then propagate a "document removed" message for this non-existing document, as if it had been a surface document 34.

Alternatively, a choice may be made to endure such relatively rare inconsistencies for a while, and have all servers periodically propagate their entire surface, similar to post catastrophic events. This would serve as a fall-back mechanism that deals with various types of inconsistencies and errors, including unforeseeable hardware and software errors in the update server. As these types of updates may be rather long, they should be sent infrequently and with low priority.

The present invention has been described with reference to a presently preferred embodiment. Other variations and embodiments of the present invention may be apparent to those of ordinary skill in the art. Accordingly, the scope of protection sought for the present invention is only limited as set out in the attached claims.

What is claimed is:

1. In a computer implemented distributed information system, a method of propagating data through a plurality of servers, comprising the steps of:

i) each of the servers individually maintaining an ordered list of the servers in the distributed information system;

ii) each of the servers individually maintaining a database containing address data for locating remote data stored remotely which is referenced by local data stored locally at each of the servers;

iii) each of the servers individually maintaining a list of data reflecting changes to the local data and remote data;

iv) selecting a priority value (p) with which to transmit the list of data wherein the priority is a real number greater than or equal to 1;

v) on a predetermined clock cycle, each of the servers transmitting their respective list of data to at least one server selected from the ordered list according to the priority value;

vi) each of the servers deleting their respective list of data once acknowledgement of the transmission is received from the at least one server;

vii) each of the at least one server receiving their respective list of data and updating their database and their local data with the received list of data, and appending their list of data with the received list of data;

viii) repeating steps v) through viii), wherein in step v), when p=1 each of the servers transmit their respective lists to a server located adjacent to each of servers on the ordered list and when p is an integer number greater than one, each of the servers transmit their respective lists to the adjacent server and to p-1 other servers selected at random from the ordered list.

2. The method according to claim 1 wherein in step i), the ordered list is arranged by an approximate geographical orientation of the plurality of server.

3. The method according to claim 2 wherein the approximate geographical orientation is circular.

4. The method of claim 1 wherein in step iv) the priority value is a real number in the range from about 1 to about 3.

5. The method of claim 1 wherein in step v), when p=1 each of the servers transmit their respective lists to a server located adjacent to each of servers on the ordered list.

6. The method of claim 1 wherein in step v), when p is a real number greater than one, each of the servers transmit their respective lists to the adjacent server, to the integer portion of p-1 other servers selected at random from the ordered list and to one other server selected at random with a probability equal to the decimal portion of p.

7. In a computer implemented distributed information system, a method of propagating object data from a server to a plurality of servers, comprising the steps of:

i) the server maintaining an ordered list of the plurality of servers in the distributed information system;

ii) the server maintaining a database containing address data for locating remote objects stored at some of the plurality of file servers which are referenced by local objects stored at the server;

iii) the server individually maintaining a list of object data including changes to the address data, local objects and remote objects;

iv) selecting a priority value with which to transmit the list of object data wherein the priority is greater than or equal to 1;

v) on a predetermined clock cycle, the server transmitting the list of object data to at least one server selected from the ordered list according to the priority value;

vi) the server deleting the list of object data once acknowledgement of the transmission is received from the at least one server;

vii) the at least one server receiving the list of object data and updating the database and the local objects with the object data, and appending the at least one servers' list of object data with the received list of object data;

viii) repeating steps v) through viii) when p=1 the server transmits the list to a server located adjacent to it on the ordered list and wherein in step v), when p is an integer number greater than one, the server transmits the list to the adjacent server and to p-1 other servers selected at random from the ordered list.

8. The method according to claim 7 wherein the plurality of servers individually perform the steps of i) through viii) in parallel.

9. The method according to claim 8 wherein in step v) each of the plurality of servers individually maintains their own predetermined clock cycle.

10. The method according to claim 9 wherein the individually maintained clock cycles are not synchronized across the distributed information system.

11. The method according to claim 8 wherein in step i), the ordered list is arranged by an approximate geographical orientation of the plurality of server.

12. The method according to claim 11 wherein the approximate geographical orientation is circular.

13. The method of one of claims 7 or 8 wherein in step iv) the priority value is a real number in the range from about 1 to about 3.

14. The method of claim 7 wherein in step v), when p is a real number greater than one, the server transmits the lists the adjacent server, to the integer portion of p-1 the other servers selected at random and to another server selected at random with a probability equal to the decimal portion of p.

15. In a computer implemented distributed information system, a method of maintaining referential integrity of a plurality of links and documents by propagating updates from a server to a plurality of servers, comprising the steps of;

i) the server maintaining an ordered list of the plurality of servers in the distributed information system;

ii) the server maintaining a link database containing the plurality of links for locating remote documents stored remotely which are referenced by documents stored locally at the server;

iii) the server maintaining an update list including messages reflecting changes to local documents and links and remote documents and links;

iv) selecting a priority value (p) with which to transmit the update list wherein the priority value is a real number greater than or equal to 1;

v) on a predetermined clock cycle, the server transmitting the update list according to the priority value wherein, the server transmits the update list to a receiving server located adjacent to it on the ordered list, to an integer portion of p-1 other receiving servers selected at random from the ordered list and to another receiving server selected at random from the ordered list with a probability equal to a fractional portion of p;

vi) the receiving servers updating their link databases and the locally stored documents with messages from the update list and appending the receiving servers' respective lists of object data with the received list of object data;

vii) repeating steps v) through vii).

16. The method according to claim 15 wherein each of the plurality of servers individually perform the steps of i) through vii) in parallel.

17. The method according to claim 16 wherein in step v) each of the plurality of servers individually maintains their own predetermined clock cycle.

18. The method according to claim 17 wherein the individually maintained clock cycles are not synchronized across the distributed information system.

19. The method according to claim 15 wherein in step i), the ordered list is arranged by an approximate geographical orientation of the plurality of server.

20. The method according to claim 19 wherein the approximate geographical orientation is circular.

* * * * *